(12) United States Patent
Burger et al.

(10) Patent No.: US 8,433,885 B2
(45) Date of Patent: Apr. 30, 2013

(54) METHOD, SYSTEM AND COMPUTER-ACCESSIBLE MEDIUM FOR PROVIDING A DISTRIBUTED PREDICATE PREDICTION

(75) Inventors: Doug Burger, Austin, TX (US); Stephen W. Keckler, Austin, TX (US); Hadi Esmaeilzadeh, Austin, TX (US)

(73) Assignee: Board of Regents of the University of Texas System, Austin, TX (US)

( * ) Notice: Subject to any disclaimer, the term of this patent is extended or adjusted under 35 U.S.C. 154(b) by 885 days.

(21) Appl. No.: 12/556,440

(22) Filed: Sep. 9, 2009

(65) Prior Publication Data

US 2011/0060889 A1   Mar. 10, 2011

(51) Int. Cl.
G06F 7/38 (2006.01)
G06F 9/00 (2006.01)
G06F 9/44 (2006.01)
G06F 15/00 (2006.01)

(52) U.S. Cl.
USPC ........................................................ 712/239

(58) Field of Classification Search .................. None
See application file for complete search history.

(56) References Cited

U.S. PATENT DOCUMENTS

| | | | |
|---|---|---|---|
| 6,178,498 B1 | 1/2001 | Sharangpani et al. | |
| 6,353,883 B1 | 3/2002 | Grochowski et al. | |
| 7,085,919 B2 | 8/2006 | Grochowski et al. | |
| 7,487,340 B2 | 2/2009 | Luick | |
| 2001/0032308 A1* | 10/2001 | Grochowski et al. | 712/226 |
| 2005/0172277 A1 | 8/2005 | Chheda et al. | |
| 2007/0288733 A1 | 12/2007 | Luick et al. | |
| 2009/0158017 A1 | 6/2009 | Mutlu et al. | |
| 2009/0172371 A1* | 7/2009 | Joao et al. | 712/240 |

OTHER PUBLICATIONS

August, D. I. et al., "A Framework for Balancing Control Flow and Predication", Proceedings of the 30th annual ACM/IEEE International Symposium on Microarchitecture, IEEE (1992).
Chang, P-Y. et al., "Using Predicated Execution to Improve the Performance of a Dynamically Scheduled Machine With Speculative Execution", Proceedings of the EFIP WG10.3 Working Conference on Parallel Architectures and Compilation Techniques, ACM (1995).
Chuang, W. et al., "Predicate Prediction for Efficient Out-of-Order Execution", Proceedings of the 17th Annual International Conference on Supercomputing, ACM, Jun. 23-26, 2003, pp. 1-10.
Mahlke, S. A. et al., "Effective Compiler Support for Predicated Execution Using the Hyperblock", Proceedings of the 25th Annual International Symposium on Microarchitecture, IEEE (1992), pp. 45-54.
Pnevmatikatos, D. N. et al., "Guarded Execution and Branch Prediction in Dynamic ILP Processors", Proceedings of the 21st Annual International Symposium on Computer Architecture, ACM (1994).
Quinoñes, E. , "Improving Branch Prediction and Predicated Execution in Out-of-Order Processors", IEEE 13th International Symposium on High Performance Computer Architecture, (2007).

(Continued)

Primary Examiner — Corey S Faherty
(74) Attorney, Agent, or Firm — Dorsey & Whitney LLP

(57) ABSTRACT

Examples of a system, method and computer accessible medium are provided to generate a predicate prediction for a distributed multi-core architecture. Using such system, method and computer accessible medium, it is possible to intelligently encode approximate predicate path information on branch instructions. Using this statically generated information, distributed predicate predictors can generate dynamic predicate histories that can facilitate an accurate prediction of high-confidence predicates, while minimizing the communication between the cores.

19 Claims, 6 Drawing Sheets

OTHER PUBLICATIONS

Quinoñes, E. et al., "Selective Predicate Prediction for Out-of-Order Processors", Proceedings of the 20th Annual International Conference on Supercomputing, ACM (2006).

International Search Report mailed Nov. 15, 2010 for Application No. PCT/US2010/038350.

* cited by examiner

METHOD, SYSTEM AND COMPUTER-ACCESSIBLE MEDIUM FOR PROVIDING A DISTRIBUTED PREDICATE PREDICTION

STATEMENT REGARDING GOVERNMENT SPONSORED RESEARCH

This invention was made with government support under F33615-03-C-4106 awarded by the Air Force. The government has certain rights in the invention.

BACKGROUND

In distributed, large-window processors, predication is a technique used to convert branches, which cause frequent changes in the control flow of the programs, to data values, which can guard instructions, and may determine which instructions are executed and which are not. Predication can linearize control flow, facilitating instructions to be provided down both possible paths which a branch may take to be collapsed, and fetching all of the instructions and only committing some of them depending on the predicate. While this model can be effective to generate large blocks of code to spread out over many execution units, it can create a problem in that the predicates, which would have been branches in a non-predicated architecture, may be evaluated at execute time (unlike branches, which are predicted shortly after they are fetched). This deferral of the evaluation of the predicates may reduce performance significantly.

Current technologies adopt one of two possibly undesirable options. First, such technologies prefer to avoid predication, which can leave every control decision as a branch, and may preclude distributing instructions over a large distributed processor. A second alternative can be to predicate instructions, but to centralize fetch and predicate prediction into a single unit, resulting in low fetch bandwidth again precluding the distribution over a large distributed multi-core processor.

In hybrid dataflow architectures, such as Very Long Instruction Word (VLIW) or Explicit Data Graph Execution (EDGE) architectures, a control flow can be a mixture of branches and predicates. Determining which branches can be if-converted to predicates may be a complex problem. It can be preferable for hard-to-predict branches to be predicated, and branches that facilitate sufficiently linearized control flow are predicated. The remaining control points can be left as branches. With such partitioning, the prediction scheme can predict all branches and the most predictable predicates, deferring the evaluation of hard-to-predict predicates to be preferred at execute time.

In a distributed dataflow machine, however, maintaining complete control histories to facilitate accurate predicate prediction can be difficult. Previous efforts in this area have typically relied on a compiler that applies "if-conversion" to hard-to-predict branches, and a particular microarchitectural mechanism to recover the cases, where the compiler makes a mistake due to a lack of run-time information. Consequently, most dataflow machines known to date have not employed a predicate prediction in a manner that can be effective for commercial applications.

BRIEF DESCRIPTION OF THE FIGURES

The foregoing and other features of the present disclosure will become more fully apparent from the following description and appended claims, taken in conjunction with the accompanying drawings. Understanding that these drawings depict only several examples in accordance with the disclosure and are, therefore, not to be considered limiting of its scope, the disclosure will be described with additional specificity and detail through use of the accompanying drawings, in which:

DETAILED DESCRIPTION

Figure 1:
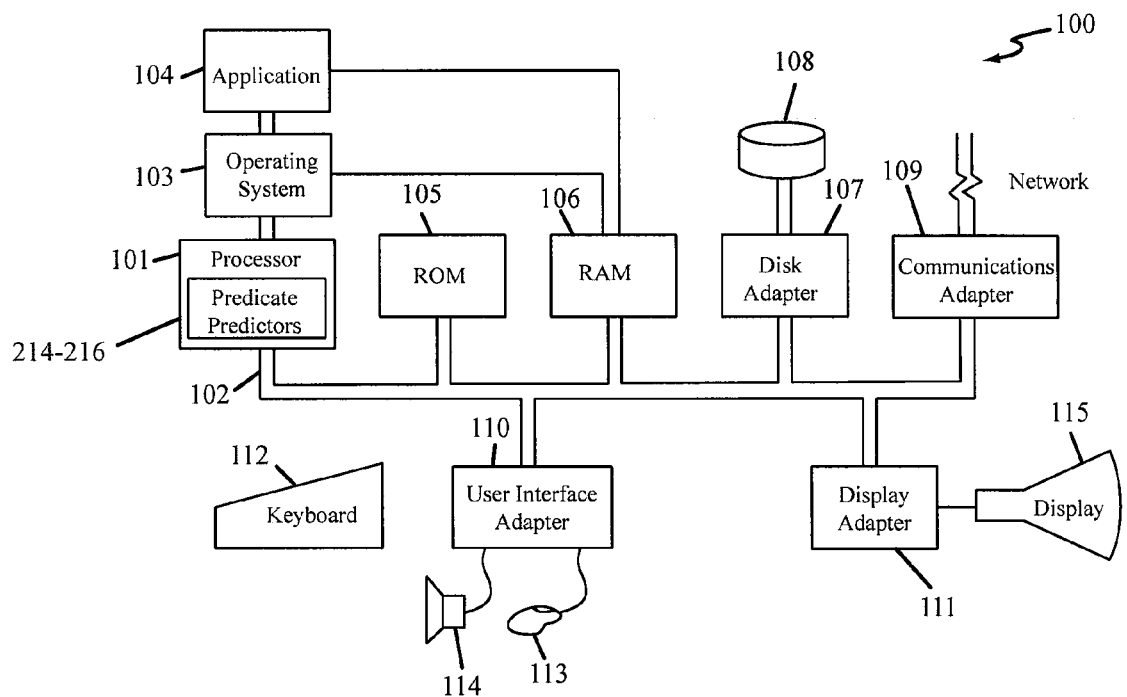
FIG. 1 is a block diagram of a representative computing system in accordance with one example.

In the following detailed description, reference is made to the accompanying drawings, which form a part hereof. In the drawings, similar symbols typically identify similar components, unless context dictates otherwise. The illustrative examples described in the detailed description, drawings, and claims are not meant to be limiting. Other examples may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are implicitly contemplated herein.

This disclosure is drawn to methods, apparatus, computer programs and systems related to predicate prediction. Certain preferred embodiments of one such system are illustrated in the figures and described below. Many other embodiments are also possible, however, time and space limitations prevent including an exhaustive list of those embodiments in one document. Accordingly, other embodiments within the scope of the claims will become apparent to those skilled in the art from the teachings of this patent.

The figures include numbering to designate illustrative components of examples shown within the drawings, including the following: a computer system 100, a processor 101, a system bus 102, an operating system 103, an application 104, a read-only memory 105, a random access memory 106, a disk adapter 107, a disk unit 108, a communications adapter 109, an interface adapter 110, a display adapter 111, a keyboard 112, a mouse 113, a speaker 114, a display monitor 115, a computing environment 201, an application program 202, an instruction data flow 203, a compiler 204, branch instructions 205, an approximate predicate path information 206, a second instruction data flow 207, a processor 210, processor cores 211-213, predicate predictors 214-216, a predicate prediction 220, block instructions 301-303, block starting addresses 304-306, a geometric history length predictor 400, a core-local history register 401, a global history register 402, a summation block 404, a prediction sign 405, global prediction tables 406-409, a confidence prediction table 410, a counter 411, a core-local prediction table 412, a core-local predicate history register, and global history registers 601-603, 605.

FIG. 1 is a schematic illustration of a block diagram of a computing system 100 arranged in accordance with some examples. Computer system 100 is also representative of a hardware environment for an example of the present disclosure. For example, computer system 100 may have a processor 101 coupled to various other components by a system bus 102. Processor 101 may be a multi-core processor with a plurality of predicate predictors 214-216 arranged in accordance with the examples herein. A more detailed description of processor 101 is provided below in connection with a description of the example shown in FIG. 2. Referring to FIG. 1, an operating system 103 may run on processor 101, and provide control and coordinate the functions of the various components of FIG. 1. An application 104 in accordance with the principles of examples of the present disclosure may execute in conjunction with operating system 103, and provide calls and/or instructions to operating system 103 where the calls/instructions implement the various functions or services to be performed by application 104.

Referring to FIG. 1, a read-only memory ("ROM") 105 may be coupled to system bus 102, and can include a basic input/output system ("BIOS") that can control certain basic functions of computer device 100. A random access memory ("RAM") 106 and a disk adapter 107 may also be coupled to system bus 102. It should be noted that software components, including operating system 103 and application 104, may be loaded into RAM 106, which may be computer system's 100 main memory for execution. A disk adapter 107 may be provided which can be an integrated drive electronics ("IDE") or parallel advanced technology attachment ("PATA") adapter, a serial advanced technology attachment ("SATA") adapter, a small computer system interface ("SCSI") adapter, a universal serial bus ("USB") adapter, an IEEE 1394 adaptor, or any other appropriate adapter that communicates with a disk unit 108, e.g., disk drive.

Referring to FIG. 1, computer system 100 may further include a communications adapter 109 coupled to bus 102. Communications adapter 109 may interconnect bus 102 with an external network (not shown) thereby facilitating computer system 100 to communicate with other similar and/or different devices.

Input/Output ("I/O") devices may also be connected to computer system 100 via a user interface adapter 110 and a display adapter 111. For example, a keyboard 112, a mouse 113 and a speaker 114 may be interconnected to bus 102 through user interface adapter 110. Data may be provided to computer system 100 through any of these example devices. A display monitor 115 may be connected to system bus 102 by display adapter 111. In this example manner, a user can provide data or other information to computer system 100 through keyboard 112 and/or mouse 113, and obtain output from computer system 100 via display 115 and/or speaker 114.

The various aspects, features, embodiments or implementations of examples of the present disclosure described herein can be used alone or in various combinations. The method examples of the present disclosure can be implemented by software, hardware or a combination of hardware and software (e.g., software stored on a computer-accessible medium).

Described herein is an example of a predicate prediction scheme for a distributed multi-core microarchitecture, which may be implemented on processor 101, and e.g., can be adapted to be used with an Explicit Data Graph Execution (EDGE) microarchitecture. The example of the distributed scheme may rely on the compiler to intelligently encode approximate predicate path information in the branch instructions. Alternatively, encoding may be accomplished using hardware means on the processor. Using this information, which may be encoded statically or dynamically, distributed predicate predictors may generate dynamic predicate histories that facilitate accurate prediction of high-confidence predicates, while reducing the communication between the cores. The example of the accurate and efficient distributed predicate prediction scheme renders it effective for the compiler to aggressively predicate the code, e.g., relying on the predicate predictor to move predicate evaluation from an execution stage to dispatch/predict stage of the pipeline.

Figure 2:
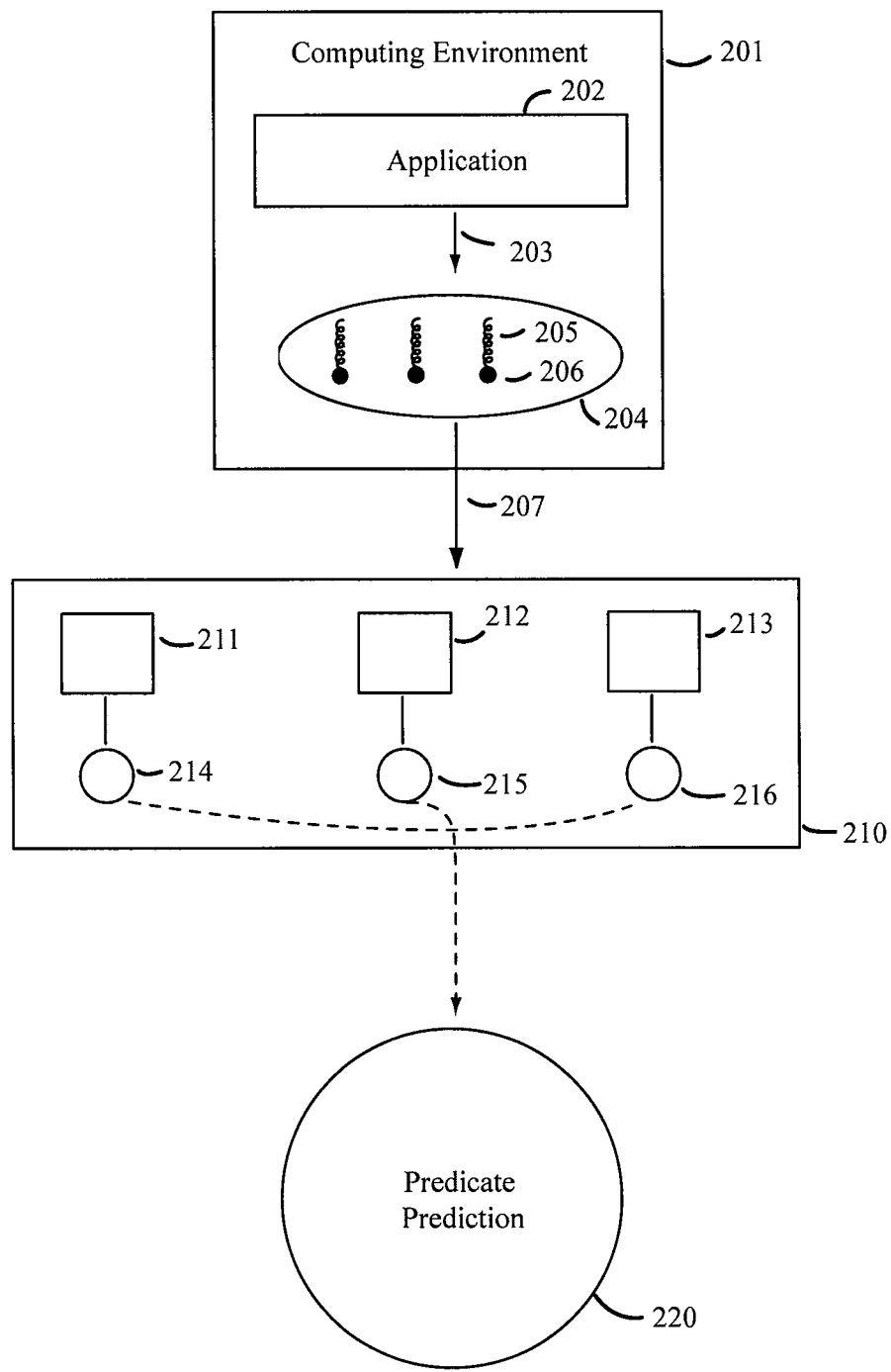
FIG. 2 is a block and flow diagram of a predicate prediction system in accordance with one example.

Thus, as shown in FIG. 2, a computing environment 201 can be provided in the computer system 100 and may include a software application program 202 and a compiler 204. Application program 202 may produce an instruction data flow 203, some or many of which may be branch instructions. Compiler 204 may encode branch instructions 205 with exact or approximate predicate path information 206. A resulting instruction data 207 may flow to a processor 101, 210 for execution. Processor 210 may include a plurality of processor cores (for simplicity, e.g., three processor cores are depicted as cores 211-213), each of which can include a respective one of predicate predictors 214-216. These predictors 214-216 may then use compiler-encoded predicate path information 206 to facilitate accurate predictions of high-confidence predicates [block 220].

Provided below is a further description of the EDGE instruction set architecture (ISA). However, it should be appreciated that examples of the present invention may be similarly used with other ISAs. The EDGE ISA has two example characteristics, e.g., a block-atomic execution (either all of the instructions of a block complete and commit, or none of them do), and a direct instruction communication (the ISA can encode the intra-block dependences in the instructions). Using this example model, a block of instruction data flow, e.g., instruction data flow 203, can complete its operation when it produces a consistent set of outputs. For example, with each round of execution, a block can write or provide data to the same number of registers, generate the same number of stored data as being statically encoded in the block header in addition to generating exactly one branch output. Instructions may communicate between blocks through registers and memory 105, 106.

The instructions may be interleaved across some or all cores aggregated as one processor 101, 210 based on their index in the block of instructions. When the processor core configuration changes, e.g., when the cores are operating as distinct processing units, the interleaving procedure may change accordingly, which can facilitate the processor to execute the block on one or more of the cores. Each type, or most types, of instructions may be encoded to receive a predicate operand. Using the dataflow execution model (e.g., a direct operand communication), an instruction can be executed when it receives all its operands, and if it is predicated, the corresponding predicate.

Figure 3:
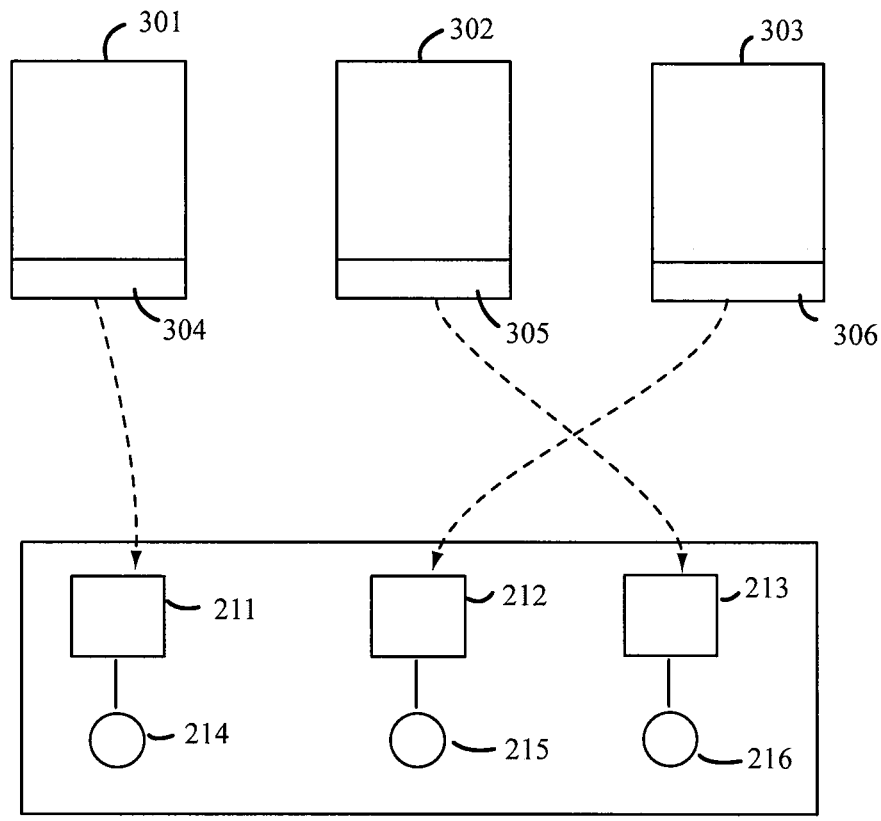
FIG. 3 is a block and flow diagram of the predicate prediction system in accordance with another example.

In an architecture according to one example, each block of instructions may have a particular core (e.g., an owner core) which coordinates the connected or participating cores to facilitate the execution of said block. For example, the owner core may be identified by a block starting address, similar or equivalent to a program counter in conventional architectures. Turning to FIG. 3, a plurality of blocks of instructions (e.g., three blocks being depicted for simplicity as blocks 301-303) are provided, each block being associated with a respective one of block starting addresses 304-306. Such addresses 304-306 can be used to identify appropriate owner cores 211-213. As depicted in FIG. 3, block 301 can be associated with (e.g., owned by) core 211 through address respective 304, block 302 can be associated with core 213 through respective address 305, and block 303 can be associated with core 212 through address respective 306. Each of the respective owner cores 211-213 may be responsible for transmitting the fetch command, predicting the next block address and passing an ownership token back thereto, gathering a completion information (e.g., including register writes, stores, exit/branch address, etc.), transmitting commit or flush command(s), and eventually obtaining the commit acknowledgement.

Figure 4:
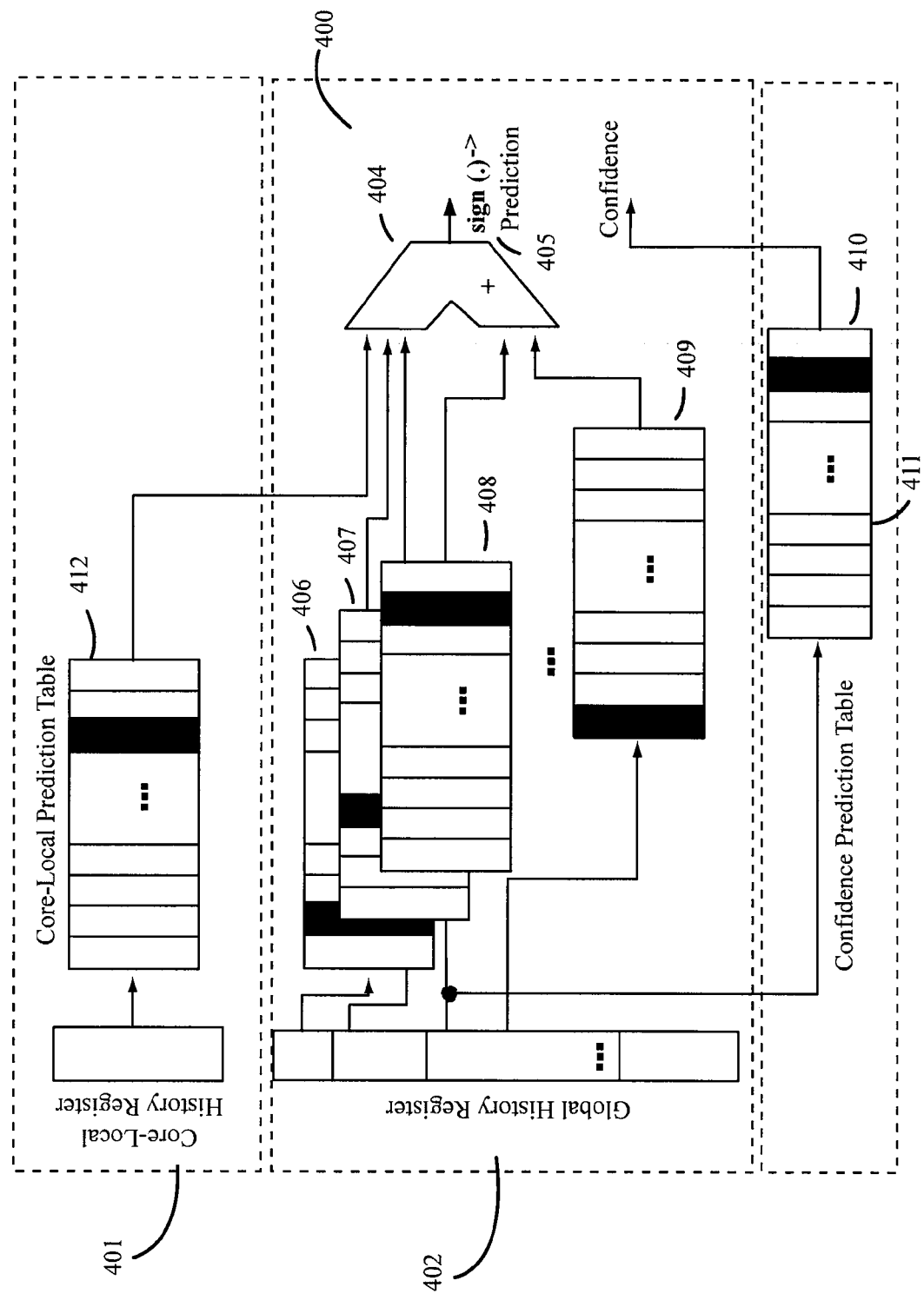
FIG. 4 is a block and flow diagram of a geometric history length predictor in accordance with one example.

Furthermore, one or more of the respective owner cores 211-213 may facilitate the prediction of the next block address. Each one of the cores 211-213 can include a respective one of fully functional block predictors 214-216, and the predictors may be identical across the cores or different from one another. The next one of block predictors 214-216 may include an exit predictor that can predict which branch is to be taken out from a block, and the associated target one of predictors 214-216 that can predict the address of the next one of blocks 214-216 based on the predicted exit target. Referring to FIG. 4, the exit predictor of predictors 214-216 may include a two-level local predictor, a global predictor, and/or a choice predictor, which can use local exit history 401 and global exit history 402. Exit histories 401, 402 may be generated from the cores 211-213 using the approximate predicate path information 206 assigned statically to each branch instruction in the respective block. The approximate predicate path information 206 may be encoded in the branch instructions, and can differentiate the specific branches of a particular block. Compiler 204 may originally assign the approximate predication path information 206 based on the sequential order of the branch instructions in the respective block. The cores 211-213 may use the exit to generate the local and global histories in the associated predictor instead of a taken/not taken information (as may be used in conventional architectures).

Each of the cores 211-213 may be augmented with a predicate prediction arrangement that may predict the output of the predicate instructions mapped on that core. A global history based predictor, which may include a base predictor and a global history register, may be used in each core. Such global history predictor may attempt to maintain the global history information updated in each of the cores 211-213, while reducing the communication among cores 211-213. First, referring to FIG. 4, in one example, a geometric history length (GEHL) predictor 400 may be used as the base predictor for performing a distributed predicate prediction. GEHL predictor 400 may include several prediction tables 406-409 indexed by independent functions of a global branch history register 402 and branch address (e.g., a core-local history register 401). The prediction may be based on the sign 405 of the summation 404 over the values retrieved from tables 406-409, as well as a value from a core-local prediction table 412 associated with core-local history register 401. In this example, a large part of the storage may be used to capture a correlation of the recent branch histories, while still facilitating a capture of the correlation with certain old branches.

Figure 6A:
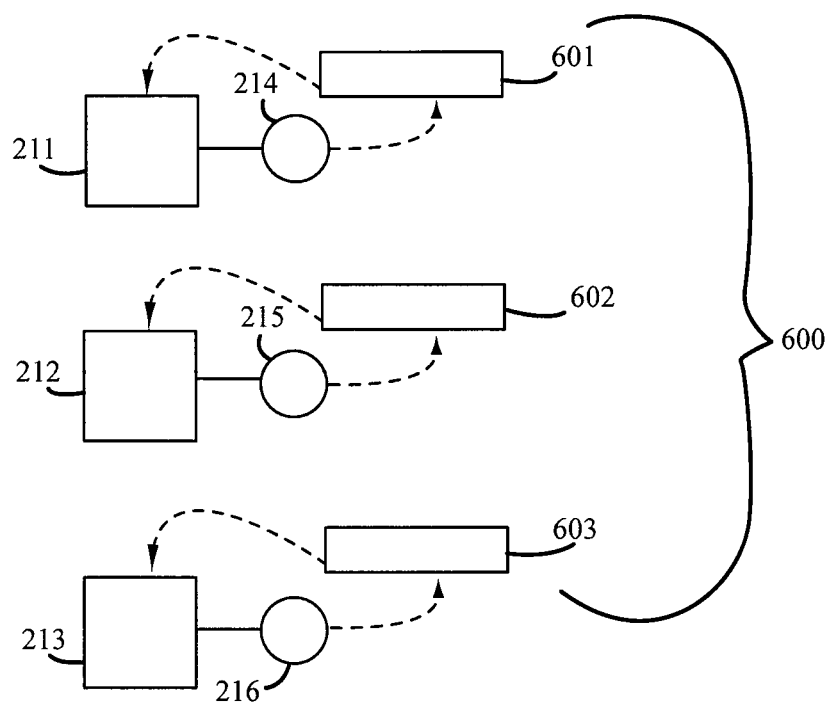
FIGS. 6(*a*) and 6(*b*) are block and flow diagrams of a global history register configuration in accordance with some examples.

Turning now to global predicate history information, several suitable examples can be provided. Certain examples may achieve a high degree of accuracy, while reducing communication among the cores 211-213. In one such example, referring to FIG. 6a, a core-local predicate history register (CLPHR) 600 can be used. Thus, e.g., the predictor may be provided to merely use the information which is only available in the core, without communicating any information with other cores. In this example, each of the cores 211-213 can have its own exclusive global history register 601-603 which can keep track of the predicate instructions mapped to such core. Compiler 204 can then attempt to map dependent instructions to that core. Consequently, dependent predicate instructions may be mapped to the same core, which can facilitate the CLPHR 600 to utilize the correlation between those instructions.

Figure 6B:
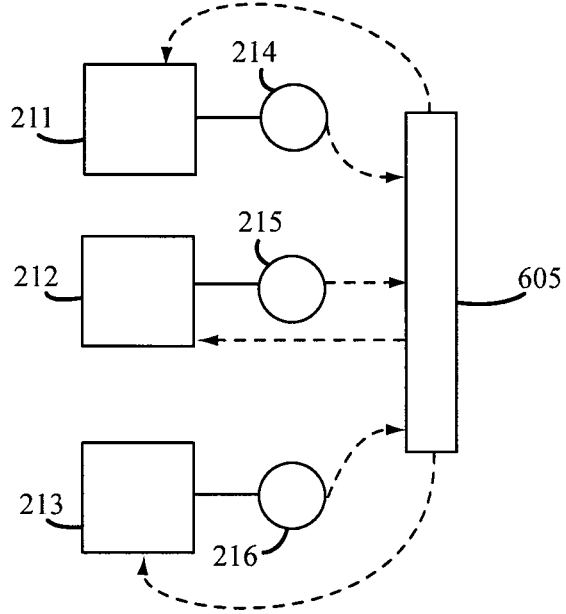

In another example, referring to FIG. 6b, a global block history register (GBHR) 605 may be provided. As the distributed exit predictor predicts the exit codes of the blocks, such exit predictor can also concatenate the exit prediction numbers or codes, thus producing the GBHR 605. In this example, compiler 204 may assign 3-bit exit codes to the branch instructions in each block, according to their sequential order in the program. Hence, the GBHR 605 can be used as the global history information. Without using any information from the predicates in the blocks, both exit and predicate predictors may share the same history information, which can reduce or eliminate the need for an additional communication mechanism.

The examples of CLPHR 600 and GBHR 605 may be combined in any suitable manner. For example, GBHR 605 may be augmented by adding another table which can be indexed by CLPHR rather than the main global history register. The prediction retrieved from this table is can be combined through an adder tree with the predictions retrieved from the GEHL tables.

In some examples, referring again to FIG. 4, a confidence prediction table 410 may be provided which may be configured to perform an estimation of the accuracy of a predicate prediction. Confidence prediction table 410 may thus facilitate the predictor to "filter out" hard-to-predict predicates (e.g., predicates with low confidence). The confidence prediction table 410 entries may be resetting counters, e.g., counter 411, that can count the number of correct consecutive predictions in a branch. For example, if a misprediction occurs, counter 411 may be reset to zero. A predicate can be selected to be predicted if the corresponding counter's value is higher than a certain threshold. In some examples, the entries in the confidence table (e.g., counter 411) can be 3-bit resetting counters which may support a high confidence threshold for configuration with a fewer number of cores. Confidence predication for predicates may be more effective than confidence prediction for branches, since the performance penalty for not predicting a predicate may be lower than not predicting a branch.

Figure 5:
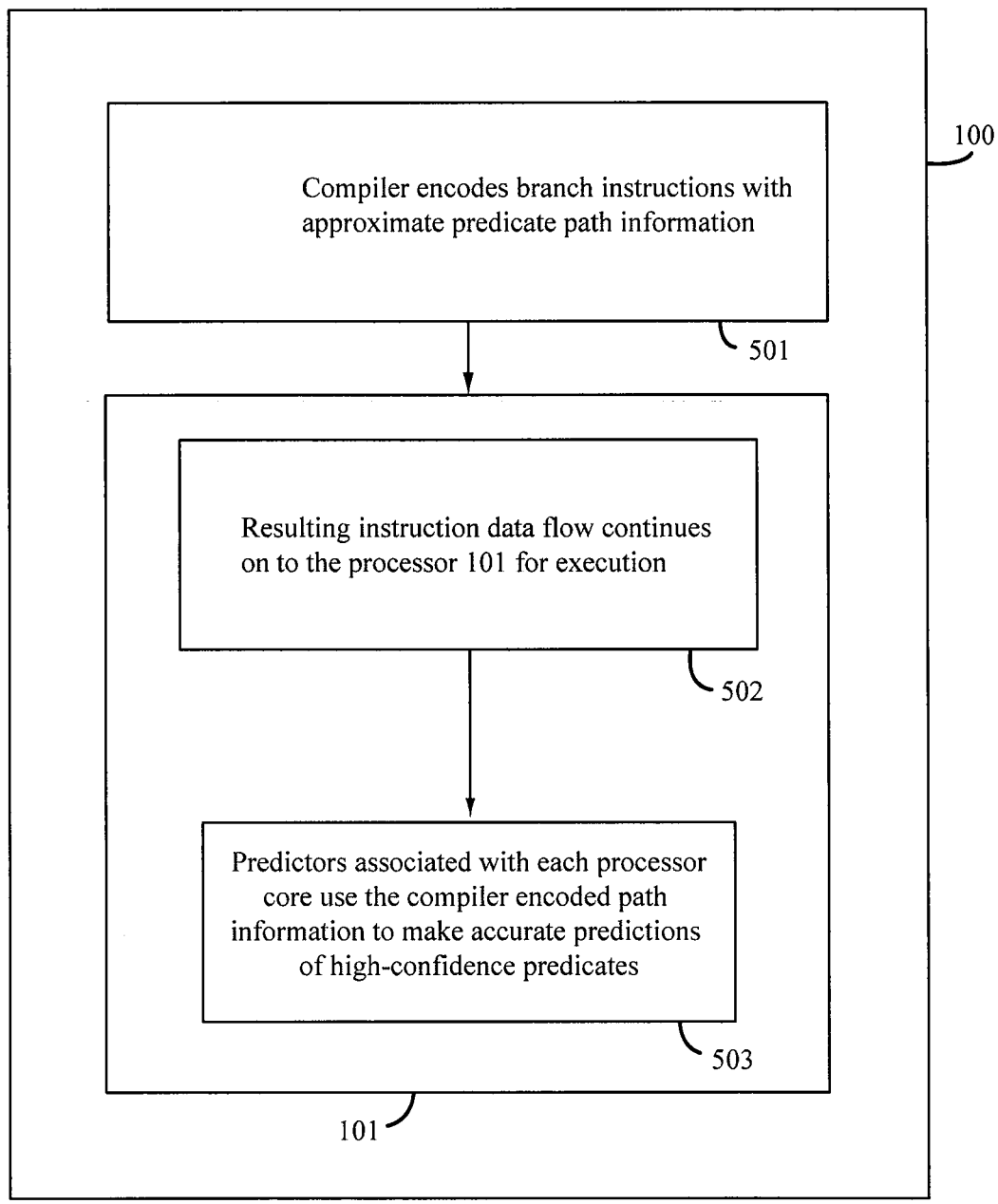
FIG. 5 is a block and flow diagram of a suitable method for a predicate prediction in accordance with one example.

An example of a method of the present invention is depicted as FIG. 5. Computer system 100 can include processor 101, which when it is executed, may be configured to perform the following procedures. In particular, processor 101 can cause compiler 204 to encode the branch instructions with approximate predicate path information [procedure 501]. Next, the resulting instruction data may be provided to processor 101 for execution [procedure 502]. These predictors associated with each processor core may then use compiler-encoded path information to facilitate accurate predictions of high-confidence predicates [procedure 503].

Disclosed in some examples is a computing system comprising a multi-core processor comprising a plurality of processor cores, each of the cores comprising at least one predicate predictor, wherein the predicate predictors generate a predicate prediction. In some examples, the computing system may further comprise an application program comprising one or more branch instructions having a predicate path information encoded thereon. In other examples, the encoding of predicate path information is accomplished by a compiler. In various other examples, the block address on each of the one or more branch instructions determines which processor core in the multi-core processor is to execute the respective branch instruction. In further examples, the multi-core processor comprises an Explicit Data Graph Execution microarchitecture. In still further examples, the one or more predicate predictors comprise a base predictor and a locally maintained global history register. In other examples, the base predictor is a geometric history length predictor. In other some examples, the global history register is a core-local predicate history register. In further examples, the global history register is a global block history register. In yet further examples, the global history register comprises a core-local predicate history register and a global block history register. In still other examples, the computing system further comprises a confidence prediction table.

Disclosed in other examples is a method for providing a predicate prediction in a multi-core processor comprising providing one or more branch instructions via a plurality of processor cores in the multi-core processor, each of the processor cores comprising at least one predicate predictor, and generating the predicate prediction using the predicate predictors. In some examples, the method may further comprise encoding approximate predicate path information in one or more branch instructions. In other examples, the encoding of predicate path information is performed by a compiler. In further examples, the method may additionally comprise determining which processor core is to execute a branch instruction using a block address for each of the one or more branch instructions. While in other examples, the one or more predicate predictors comprise a base predictor and a global history register. In still further examples, the base predictor is a geometric history length predictor. In yet other examples, the global history register is a core-local predicate history register. In various other examples, the global history register is a global block history register.

Disclosed in yet other examples is a computer accessible medium having stored thereon computer executable instructions for providing a predicate prediction within a multi-core processor computing system, wherein when a processing arrangement executes the instructions, the processing arrangement is configured to perform procedures comprising encoding approximate predicate path information in one or more branch instructions, executing the one or more branch instructions on one or more processor cores in the multi-core processor, each of the one or more processor cores comprising one or more predicate predictors, and generating a predicate prediction using the one or more predicate predictors.

The present disclosure is not to be limited in terms of the particular examples described in this application, which are intended as illustrations of various aspects. Many modifications and examples can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and examples are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular examples only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to examples containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells or cores refers to groups having 1, 2, or 3 cells or cores. Similarly, a group having 1-5 cells or cores refers to groups having 1, 2, 3, 4, or 5 cells or cores, and so forth.

While various aspects and examples have been disclosed herein, other aspects and examples will be apparent to those skilled in the art. The various aspects and examples disclosed herein are for purposes of illustration and are not intended to be limiting, with the true scope and spirit being indicated by the following claims.

What is claimed is:

1. A computing system, comprising a multi-core processor that includes a plurality of processor cores, each of the plurality of processor cores comprising a predicate predictor, wherein at least one predicate predictor is configured to predict an output of a predicate instruction mapped to a corresponding processing core of the plurality of processing cores, wherein the predicate instruction is generated from a branch instruction that is included in a block of instructions, wherein the block of instructions includes a block address that determines which processing core of the plurality of processing cores are assigned to execute the branch instruction, wherein the prediction is based on information encoded in the branch instruction, and wherein the information encoded in the branch instruction represents at least a portion of a predicate path or an approximation of a predicate path.

2. The computing system of claim 1, wherein at least one processor core of the plurality of processor cores is configured to execute an application program comprising the branch instruction.

3. The computing system of claim 1, further comprising a compiler configured to encode the branch instruction with the information, wherein the information includes the at least the portion of the predicate path or the approximation of the predicate path.

4. The computing system of claim 1, wherein the multi-core processor comprises an Explicit Data Graph Execution microarchitecture.

5. The computing system of claim 1, wherein at least one predicate predictor comprises a base predictor and a global history register, wherein the prediction is further based on the base predictor and the global history register.

6. The computing system of claim 5, wherein the predicate predictor further comprises a geometric history length predictor.

7. The computing system of claim 5, wherein the global history register comprises a core-local predicate history register, and wherein the core-local predicate history register is configured to store data relative to the predicate predictor of the corresponding processing core.

8. The computing system of claim 5, wherein the global history register comprises a global block history register, and wherein the global block history register is configured to store a plurality of entries related to a plurality of blocks of instruction, wherein each of the plurality of entries include predicted exit codes corresponding to an associated branch instruction.

9. The computing system of claim 5, wherein the global history register comprises:

a core-local predicate history register configured to store data relative to the predicate predictor of the corresponding processing core; and a global block history register configured to store a plurality of entries related to a plurality of blocks of instructions, wherein the history includes predicted exit codes associated with each entry of the plurality of entries.

10. The computing system of claim 1, wherein each of the predicate predictors is configured to predict outputs of a plurality of predicate instructions, and at least one of the plurality of processing cores is configured to obtain a confidence prediction indicative of an accuracy of each prediction, and to determine which outputs of corresponding predicate instructions should be subsequently predicted based on the confidence prediction.

11. A method for providing a predicate prediction in a multi-core processor, comprising:

providing a predicate predictor for each of a plurality of processor cores in the multi-core processor, wherein at least one predicate predictor comprises a base predictor and a global block history register, wherein the global block history register is configured to store a plurality of entries related to a plurality of blocks of instruction, wherein the history includes predicted exit codes associated with each entry of the plurality of entries; and predicting an output of a predicate instruction mapped to a corresponding processing core of the plurality of processing cores, wherein the predicate instruction is generated from a branch instruction, wherein predicting the output of the predicate instruction is based on information encoded in the branch instruction, wherein predicting the output of the predicate instruction is further based on the base predictor and the global block history register, and wherein the information encoded in the branch instruction represents one of at least a portion of a predicate path or an approximation of a predicate path.

12. The method of claim 11, further comprising executing an application program by at least one of the processing cores of the plurality of processing cores, wherein the application program comprises the branch instruction.

13. The method of claim 11, further comprising encoding the information on the branch instruction using a compiler or hardware means, wherein, the information includes the at least the portion of the predicate path or the approximation of the predicate path.

14. The method of claim 11, wherein the information is encoded on the branch instruction statically or dynamically, wherein, the information includes the at least the portion of the predicate path or the approximation of the predicate path.

15. The method of claim 12, wherein the branch instruction is included in a block of instructions, wherein the block of instructions includes a block address, the method further comprising determining which processor core is to execute the branch instruction using a the block address for each of the branch instructions.

16. The method of claim 11, wherein the base predictor is a geometric history length predictor and wherein the global history register is a core-local predicate history register configured to store data relative to the predicate predictor of the corresponding at least one-processing core.

17. A non-transitory computer accessible medium having stored thereon computer executable instructions for providing a predicate prediction within a multi-core processor computing system, wherein a processing arrangement is configured to perform processing procedures when the processing arrangement executes the instructions, the processing procedures comprising:

providing a predicate predictor for each of a plurality of processor cores in the multi-core processor, each of the processor cores comprising at least one predicate predictor; and predicting an output of a predicate instruction mapped to a corresponding processing core of the plurality of processing cores, wherein the predicate instruction is generated from a branch instruction, and wherein predicting the output of the predicate instruction is based on information encoded in the branch instruction that is included in a block of instructions, wherein the block of instructions includes a block address that determines which processing core of the multi-core processing system are assigned to execute the branch instruction, wherein the information encoded in the branch instruction represents one of at least a portion of a predicate path or an approximation of a predicate path.

18. A computing system comprising a multi-core processor that includes a plurality of processor cores, each of the plurality of processor cores comprising a predicate predictor, wherein at least one predicate predictor is configured to predict an output of a predicate instruction mapped to a corresponding processing core of the plurality of processing cores, wherein at least one predicate predictor comprises a base predictor and a global history register, wherein the global history register comprises a core-local predicate history register configured to store data relative to the predicate predictor of the corresponding processing core, and a global block history register configured to store a plurality of entries related to a plurality of blocks of instruction, wherein the history includes predicted exit codes associated with each entry of the plurality of entries, wherein the predicate instruction is generated from a branch instruction, wherein the prediction is based on information encoded in the branch instruction, wherein the prediction is further based on the base predictor and the global history register, and wherein the information encoded in the branch instruction represents at least a portion of a predicate path or an approximation of a predicate path.

19. A method for providing a predicate prediction in a multi-core processor, comprising:

providing a predicate predictor for each of a plurality of processor cores in the multi-core processor; and predicting an output of a predicate instruction mapped to a corresponding processing core of the plurality of processing cores, wherein the predicate instruction is generated from a branch instruction that is included in a block of instructions, wherein the block of instructions includes a block address that determines which processing core of the plurality of processing cores are assigned to execute the branch instruction, wherein predicting the output of the predicate instruction is based on information encoded in the branch instruction, and wherein the information encoded in the branch instruction represents one of at least a portion of a predicate path or an approximation of a predicate path.

* * * * *

UNITED STATES PATENT AND TRADEMARK OFFICE
CERTIFICATE OF CORRECTION

PATENT NO. : 8,433,885 B2
APPLICATION NO. : 12/556440
DATED : April 30, 2013
INVENTOR(S) : Burger et al.

It is certified that error appears in the above-identified patent and that said Letters Patent is hereby corrected as shown below:

In the Specification

In Column 2, Line 51, delete "interface" and insert -- user interface --, therefor.

In Column 7, Line 6, delete "In other some examples," and insert -- In some other examples, --, therefor.

In the Claims

In Column 10, Lines 54-55, in Claim 15, delete "using a the block address for each of the branch instructions." and insert -- using the block address. --, therefor.

In Column 10, Line 60, in Claim 16, delete "corresponding at least one-processing core." and insert -- corresponding processing core. --, therefor.

Signed and Sealed this
Thirtieth Day of July, 2013

Teresa Stanek Rea
*Acting Director of the United States Patent and Trademark Office*